US011142674B2

(12) United States Patent
Rached

(10) Patent No.: US 11,142,674 B2
(45) Date of Patent: Oct. 12, 2021

(54) TRIFLUOROETHYLENE-BASED COMPOSITIONS AND USES THEREOF

(71) Applicant: Arkema France, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 16/616,058

(22) PCT Filed: May 31, 2018

(86) PCT No.: PCT/EP2018/064360
§ 371 (c)(1),
(2) Date: Nov. 22, 2019

(87) PCT Pub. No.: WO2018/220127
PCT Pub. Date: Dec. 6, 2018

(65) Prior Publication Data
US 2020/0087555 A1 Mar. 19, 2020

(30) Foreign Application Priority Data

Jun. 2, 2017 (FR) ...................................... 1754923

(51) Int. Cl.
*C09K 5/04* (2006.01)

(52) U.S. Cl.
CPC ........ *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
CPC .............. C09K 2205/126; C09K 5/045; C09K 2205/22
See application file for complete search history.

(56) References Cited

U.S. PATENT DOCUMENTS

| | | | |
|---|---|---|---|
| 5,056,990 A | 10/1991 | Nakajima | |
| 5,065,990 A | 11/1991 | Durfee | |
| 5,363,674 A | 11/1994 | Powell | |
| 2014/0070132 A1 | 3/2014 | Fukushima | |
| 2015/0337191 A1 | 11/2015 | Fukushima | |
| 2016/0075927 A1* | 3/2016 | Fukushima | C09K 5/045 252/68 |
| 2016/0333241 A1* | 11/2016 | Fukushima | C09K 5/045 |
| 2016/0333243 A1 | 11/2016 | Fukushima et al. | |
| 2016/0347981 A1 | 12/2016 | Fukushima | |
| 2016/0369147 A1* | 12/2016 | Fukushima | F25B 1/00 |
| 2018/0079941 A1 | 3/2018 | Ueno et al. | |
| 2018/0320043 A1* | 11/2018 | Tasaka | C09K 5/045 |
| 2018/0363965 A1* | 12/2018 | Hayamizu | C09K 5/045 |
| 2019/0257553 A1 | 8/2019 | Ono et al. | |
| 2020/0230454 A1* | 7/2020 | Robin | A62D 1/0071 |

FOREIGN PATENT DOCUMENTS

| | | |
|---|---|---|
| JP | 2015-214632 A | 12/2015 |
| JP | 2015-215111 A | 12/2015 |
| WO | WO 2012/177742 A2 | 12/2012 |
| WO | WO 2012/177742 A3 | 12/2012 |
| WO | WO 2015/005290 * | 1/2015 |
| WO | 2016190177 A1 | 12/2016 |
| WO | WO 2016/190177 A1 | 12/2016 |
| WO | WO 2018/047816 A1 | 3/2018 |

OTHER PUBLICATIONS

International Search Report (PCT/ISA/210) dated Jul. 31, 2018, by the European Patent Office as the International Searching Authority for International Application No. PCT/EP2018/064360.
U.S. Appl. No. 16/972,256, Rached.
Rached, Wissam, U.S. Appl. No. 16/972,256 entitled "Compositions Based on 1,1,2-Trifluoroethylene and Carbon Dioxide," filed in the U.S. Patent and Trademark Office on Dec. 4, 2020.

* cited by examiner

Primary Examiner — John R Hardee
(74) Attorney, Agent, or Firm — Buchanan Ingersoll & Rooney P.C.

(57) ABSTRACT

The present invention relates to a composition comprising:
trifluoroethylene;
pentafluoroethane; and
at least one compound C chosen from the group constituted by difluoromethane, 1,1,1-trifluoropropene, trifluoroethane, 1,1,1,2-tetrafluoroethane, monofluoroethane, 1,1,1,4,4,4-hexafluorobut-2-ene, 3,3,4,4,4-pentafluorobut-1-ene, 2,4,4,4-tetrafluorobut-1-ene, 1,1,1,3,3-pentafluoropropane, 2,3,3,3-tetrafluoropropene, 1,1,2,2-tetrafluoroethane, 1,1-difluoroethane, 1,1,1,3,3-pentafluorobutane, butane, 1,1,1,2,3,3,3-heptafluoropropane, 1-chlorotrifluoropropene, 2-methylbutane, pentane, propane, and mixtures thereof.
The present invention also relates to the uses thereof in refrigeration, air conditioning and heat pumps.

17 Claims, No Drawings

TRIFLUOROETHYLENE-BASED COMPOSITIONS AND USES THEREOF

FIELD OF THE INVENTION

The present invention relates to trifluoroethylene-based compositions and to their uses as heat-transfer fluid, notably in refrigeration, air conditioning and heat pumps.

TECHNICAL BACKGROUND

Fluids based on fluorocarbon compounds are widely used in systems for transfer of heat by vapor compression, notably air conditioning, heat pump, refrigeration or freezing devices. A feature which these devices have in common is that they are based on a thermodynamic cycle comprising the evaporation of the fluid at low pressure (in which the fluid absorbs heat); the compression of the evaporated fluid up to a high pressure; the condensation of the evaporated fluid to give a liquid at high pressure (in which the fluid discharges heat); and the expansion of the fluid in order to complete the cycle.

The choice of a heat-transfer fluid (which can be a pure compound or a mixture of compounds) is dictated, on the one hand, by the thermodynamic properties of the fluid and, on the other hand, by additional constraints. Thus, a particularly important criterion is that of the impact on the environment of the fluid under consideration. In particular, chlorinated compounds (chlorofluorocarbons and hydrochlorofluorocarbons) have the drawback of damaging the ozone layer. Thus, nonchlorinated compounds, such as hydrofluorocarbons, fluoroethers and fluoroolefins, are now generally preferred thereto.

Heat-transfer fluids currently used are HFC-134a, R404A (ternary mixture of 52% HFC-143a, 44% HFC-125 and 4% HFC-134a), R452A (ternary mixture of 11% HFC-32, 59% HFC-125 and 30% HFO-1234yf), R407C (ternary mixture of 52% HFC-134a, 25% HFC-125 and 23% HFC-32), and the like.

However, there is an ongoing need to develop other heat-transfer fluids which have at least one of the following advantages: a lower global warming potential (GWP) than that of the above fluids, and/or equivalent and preferably improved performance qualities, and/or a small temperature glide at the evaporator, and/or a low outlet temperature at the compressor, and/or being nonflammable or only slightly flammable.

DESCRIPTION OF THE INVENTION

The present invention relates to a composition comprising:
trifluoroethylene (R1123);
pentafluoroethane (HFC-125); and
at least one compound C chosen from the group constituted by difluoromethane (HFC-32), 1,1,1-trifluoropropene (HFO-1243zf), trifluoroethane (HFC-143a), 1,1,1,2-tetrafluoroethane (HFC-134a), monofluoroethane (HFC-161), 1,1,1,4,4,4-hexafluorobut-2-ene (HFO-1336mmz, E or Z isomer), 1-chlorotrifluoropropene (HFO-1233zd), 3,3,4,4,4-pentafluorobut-1-ene (HFO-1345fz), 2,4,4,4-tetrafluorobut-1-ene (HFO-1354mfy), 1,1,1,3,3-pentafluoropropane (HFC-245fa), 2,3,3,3-tetrafluoropropene (HFO-1234yf), 1,1,2,2-tetrafluoroethane (HFC-134), 1,1-difluoroethane (HFC-152a), 1,1,1,2,3,3,3-heptafluoropropane (HFC-227ea), 1,1,1,3,3-pentafluorobutane (HFC-365mfc), butane (HC-600), 2-methylbutane (HC-601a), pentane (HC-601), propane, and mixtures thereof.

According to the invention, the composition may comprise a compound C or a mixture of compounds C.

Preferably, the abovementioned composition consists essentially of, in particular consists of:
trifluoroethylene (R1123);
pentafluoroethane (HFC-125); and
at least one compound C chosen from the group constituted by difluoromethane (HFC-32), 1,1,1-trifluoropropene (HFO-1243zf), trifluoroethane (HFC-143a), 1,1,1,2-tetrafluoroethane (HFC-134a), monofluoroethane (HFC-161), 1,1,1,4,4,4-hexafluorobut-2-ene (HFO-1336mmz, E or Z isomer), 3,3,4,4,4-pentafluorobut-1-ene (HFO-1345fz), 2,4,4,4-tetrafluorobut-1-ene (HFO-1354mfy), 1,1,1,3,3-pentafluoropropane (HFC-245fa), 2,3,3,3-tetrafluoropropene (HFO-1234yf), 1,1,2,2-tetrafluoroethane (HFC-134), 1,1-difluoroethane (HFC-152a), 1,1,1,3,3-pentafluorobutane (HFC-365mfc), butane (HC-600), 2-methylbutane (HC-601a), pentane (HC-601), propane, and mixtures thereof. Impurities may be present in such compositions, in a proportion, for example, of less than 1%, preferably of less than 0.5%, preferably of less than 0.1%, preferentially of less than 0.05% and in particular of less than 0.01%. These impurities do not have a significant impact on the properties of the compositions.

According to one embodiment, the abovementioned composition comprises (preferably consists essentially of, and preferentially consists of):
trifluoroethylene (R1123);
pentafluoroethane (HFC-125); and
at least one compound C chosen from the group constituted by 1,1,1,2-tetrafluoroethane (HFC-134a), 2,3,3,3-tetrafluoropropene (HFO-1234yf), 1,1,2,2-tetrafluoroethane (HFC-134), 1,1-difluoroethane (HFC-152a), and mixtures thereof.

Preferably, the abovementioned composition comprises (preferably consists essentially of, and preferentially consists of):
trifluoroethylene (R1123);
pentafluoroethane (HFC-125); and
at least one compound C chosen from the group constituted by 1,1,1,2-tetrafluoroethane (HFC-134a), 2,3,3,3-tetrafluoropropene (HFO-1234yf), and mixtures thereof.

The weight content of trifluoroethylene (R1123) in the composition according to the invention may be, for example, between 1% and 99%, 5% and 95%, 5% and 90%, 5% and 85%, 5% and 80%, 5% and 75%, 5% and 70%, 5% and 65%, 5% and 60%, 5% and 55%, 5% and 50%, 5% and 45%, 5% and 40%, 5% and 35%, 5% and 30%, 5% and 25%, 5% and 20%, 5% and 15%, 5% and 10%, 10% and 95%, 10% and 90%, 10% and 85%, 10% and 80%, 10% and 75%, 10% and 70%, 10% and 65%, 10% and 60%, 10% and 55%, 10% and 50%, 10% and 45%, 10% and 40%, 10% and 35%, 10% and 30%, 10% and 25%, 10% and 20%, 10% and 15%, 15% and 95%, 15% and 90%, 15% and 85%, 15% and 80%, 15% and 75%, 15% and 70%, 15% and 65%, 15% and 60%, 15% and 55%, 15% and 50%, 15% and 45%, 15% and 40%, 15% and 35%, 15% and 30%, 15% and 25%, 15% and 20%, 20% and 95%, 20% and 90%, 20% and 85%, 20% and 80%, 20% and 75%, 20% and 70%, 20% and 65%, 20% and 60%, 20% and 55%, 20% and 50%, 20% and 45%, 20% and 40%, 20% and 35%, 20% and 30%, 20% and 25%, 25% and 95%, 25% and 90%, 25% and 85%, 25% and 80%, 25% and 75%, 25% and 70%, 25% and 65%, 25% and 60%, 25% and 55%, 25% and 50%, 25% and 45%, 25% and 40%, 25% and 35%, 25% and 30%, 30% and 95%, 30% and 90%, 30% and 85%, 30% and 80%, 30% and 75%, 30% and 70%, 30% and 65%, 30% and 60%, 30% and 55%, 30% and 50%, 30% and 45%, 30% and 40%, 30% and 35%, 35% and 95%, 35% and 90%, 35% and 85%, 35% and 80%, 35% and 75%, 35% and 70%, 35% and 65%, 35% and 60%, 35% and 55%, 35% and 50%, 35% and 45%, 35% and 40%, 40% and 95%, 40% and 90%, 40% and 85%, 40% and 80%, 40% and 75%, 40% and 70%, 40% and 65%, 40% and 60%, 40% and 55%, 40% and 50%, 40% and 45%, 45% and 95%, 45% and 90%, 45% and 85%, 45% and 80%, 45% and 75%, 45% and 70%, 45% and 65%, 45% and 60%, 45% and 55%, 45% and 50%, 50% and 90%, 50% and 90%, 50% and 85%, 50% and 80%, 50% and 75%, 50% and 70%, 50% and 65%, 50% and 60%, 50% and 55%, 55% and 95%, 55% and 90%, 55% and 85%, 55% and 80%, 55% and 75%, 55% and 70%, 55% and 65%, 55% and 60%, 60% and 95%, 60% and 90%, 60% and 85%, 60% and 80%, 60% and 75%, 60% and 70%, 60% and 65%, 65% and 95%, 65% and 90%, 65% and 85%, 65% and 80%, 65% and 75%, 65% and 70%, 70% and 95%, 70% and 90%, 70% and 85%, 70% and 80%, 70% and 75%, 75% and 95%, 75% and 90%, 75% and 85%, 75% and 80%, 80% and 95%, 80% and 90%, 80% and 85%, 85% and 95%, or between 85% and 90%.

Preferably, the weight content of trifluoroethylene (R1123) in the composition is between 5% and 70%, preferentially between 5% and 60%, advantageously between 5% and 55%.

According to the invention, the weight percentages are indicated relative to the total weight of the composition.

The weight content of trifluoroethylene (R1123) in the composition may be greater than or equal to 5%, preferably greater than or equal to 10%, preferably greater than or equal to 15%, advantageously greater than or equal to 20%, for example greater than or equal to 25%, preferentially greater than or equal to 30%.

Preferably, the weight content of trifluoroethylene (R1123) in the composition is chosen from one of the following contents: 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

The weight content of pentafluoroethane (HFC-125) in the composition may be, for example, between 1% and 99%, 1% and 95%, 1% and 90%, 1% and 85%, 1% and 80%, 1% and 75%, 1% and 70%, 1% and 65%, 1% and 60%, 1% and 55%, 1% and 50%, 1% and 45%, 1% and 40%, 1% and 35%, 1% and 30%, 1% and 25%, 1% and 20%, 1% and 15%, 1% and 10%, 2% and 95%, 2% and 90%, 2% and 85%, 2% and 80%, 2% and 75%, 2% and 70%, 2% and 65%, 2% and 60%, 2% and 55%, 2% and 50%, 2% and 45%, 2% and 40%, 2% and 35%, 2% and 30%, 2% and 25%, 2% and 20%, 2% and 15%, 2% and 10%, 3% and 95%, 3% and 90%, 3% and 85%, 3% and 80%, 3% and 75%, 3% and 70%, 3% and 65%, 3% and 60%, 3% and 55%, 3% and 50%, 3% and 45%, 3% and 40%, 3% and 35%, 3% and 30%, 3% and 25%, 3% and 20%, 3% and 15%, 3% and 10%, 4% and 95%, 4% and 90%, 4% and 85%, 4% and 80%, 4% and 75%, 4% and 70%, 4% and 65%, 4% and 60%, 4% and 55%, 4% and 50%, 4% and 45%, 4% and 40%, 4% and 35%, 4% and 30%, 4% and 25%, 4% and 20%, 4% and 15%, 4% and 10%, 5% and 95%, 5% and 90%, 5% and 85%, 5% and 80%, 5% and 75%, 5% and 70%, 5% and 65%, 5% and 60%, 5% and 55%, 5% and 50%, 5% and 45%, 5% and 40%, 5% and 35%, 5% and 30%, 5% and 25%, 5% and 20%, 5% and 15%, 5% and 10%, 10% and 95%, 10% and 90%, 10% and 85%, 10% and 80%, 10% and 75%, 10% and 70%, 10% and 65%, 10% and 60%, 10% and 55%, 10% and 50%, 10% and 45%, 10% and 40%, 10% and 35%, 10% and 30%, 10% and 25%, 10% and 20%, 10% and 15%, 15% and 95%, 15% and 90%, 15% and 85%, 15% and 80%, 15% and 75%, 15% and 70%, 15% and 65%, 15% and 60%, 15% and 55%, 15% and 50%, 15% and 45%, 15% and 40%, 15% and 35%, 15% and 30%, 15% and 25%, 15% and 20%, 20% and 95%, 20% and 90%, 20% and 85%, 20% and 80%, 20% and 75%, 20% and 70%, 20% and 65%, 20% and 60%, 20% and 55%, 20% and 50%, 20% and 45%, 20% and 40%, 20% and 35%, 20% and 30%, 20% and 25%, 25% and 95%, 25% and 90%, 25% and 85%, 25% and 80%, 25% and 75%, 25% and 70%, 25% and 65%, 25% and 60%, 25% and 55%, 25% and 50%, 25% and 45%, 25% and 40%, 25% and 35%, 25% and 30%, 30% and 95%, 30% and 90%, 30% and 85%, 30% and 80%, 30% and 75%, 30% and 70%, 30% and 65%, 30% and 60%, 30% and 55%, 30% and 50%, 30% and 45%, 30% and 40%, 30% and 35%, 35% and 95%, 35% and 90%, 35% and 85%, 35% and 80%, 35% and 75%, 35% and 70%, 35% and 65%, 35% and 60%, 35% and 55%, 35% and 50%, 35% and 45%, 35% and 40%, 40% and 95%, 40% and 90%, 40% and 85%, 40% and 80%, 40% and 75%, 40% and 70%, 40% and 65%, 40% and 60%, 40% and 55%, 40% and 50%, 40% and 45%, 45% and 95%, 45% and 90%, 45% and 85%, 45% and 80%, 45% and 75%, 45% and 70%, 45% and 65%, 45% and 60%, 45% and 55%, 45% and 50%, 50% and 90%, 50% and 90%, 50% and 85%, 50% and 80%, 50% and 75%, 50% and 70%, 50% and 65%, 50% and 60%, 55% and 95%, 55% and 90%, 55% and 85%, 55% and 80%, 55% and 75%, 55% and 70%, 55% and 65%, 55% and 60%, 60% and 95%, 60% and 90%, 60% and 85%, 60% and 80%, 60% and 75%, 60% and 70%, 60% and 65%, 65% and 95%, 65% and 90%, 65% and 85%, 65% and 80%, 65% and 75%, 65% and 70%, 70% and 95%, 70% and 90%, 70% and 85%, 70% and 80%, 70% and 75%, 75% and 95%, 75% and 90%, 75% and 85%, 75% and 80%, 80% and 95%, 80% and 90%, 80% and 85%, 85% and 95%, or between 85% and 90%.

Preferably, the weight content of pentafluoroethane (HFC-125) in the composition is between 1% and 70%, preferentially between 1% and 60%, advantageously between 1% and 55%, in particular between 5% and 55%.

The weight content of pentafluoroethane (HFC-125) in the composition may be greater than or equal to 1%, preferably greater than or equal to 5%, preferably greater than or equal to 10%, advantageously greater than or equal to 15%, for example greater than or equal to 20%, preferentially greater than or equal to 30%.

Preferably, the weight content of pentafluoroethane (HFC-125) in the composition is chosen from one of the following contents: 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

The weight content of compound(s) C in the composition may be, for example, between 1% and 99%, 5% and 95%, 5% and 90%, 5% and 85%, 5% and 80%, 5% and 75%, 5% and 70%, 5% and 65%, 5% and 60%, 5% and 55%, 5% and 50%, 5% and 45%, 5% and 40%, 5% and 35%, 5% and 30%, 5% and 25%, 5% and 20%, 5% and 15%, 5% and 10%, 10% and 95%, 10% and 90%, 10% and 85%, 10% and 80%, 10% and 75%, 10% and 70%, 10% and 65%, 10% and 60%, 10% and 55%, 10% and 50%, 10% and 45%, 10% and 40%, 10% and 35%, 10% and 30%, 10% and 25%, 10% and 20%, 10% and 15%, 15% and 95%, 15% and 90%, 15% and 85%, 15% and 80%, 15% and 75%, 15% and 70%, 15% and 65%, 15% and 60%, 15% and 55%, 15% and 50%, 15% and 45%, 15% and 40%, 15% and 35%, 15% and 30%, 15% and 25%, 15% and 20%, 20% and 95%, 20% and 90%, 20% and 85%, 20% and 80%, 20% and 75%, 20% and 70%, 20% and 65%, 20% and 60%, 20% and 55%, 20% and 50%, 20% and 45%, 20% and 40%, 20% and 35%, 20% and 30%, 20% and 25%, 25% and 95%, 25% and 90%, 25% and 85%, 25% and 80%, 25% and 75%, 25% and 70%, 25% and 65%, 25% and 60%, 25% and 55%, 25% and 50%, 25% and 45%, 25% and 40%, 25% and 35%, 25% and 30%, 30% and 95%, 30% and 90%, 30% and 85%, 30% and 80%, 30% and 75%, 30% and 70%, 30% and 65%, 30% and 60%, 30% and 55%, 30% and 50%, 30% and 45%, 30% and 40%, 30% and 35%, 35% and 95%, 35% and 90%, 35% and 85%, 35% and 80%, 35% and 75%, 35% and 70%, 35% and 65%, 35% and 60%, 35% and 55%, 35% and 50%, 35% and 45%, 35% and 40%, 40% and 95%, 40% and 90%, 40% and 85%, 40% and 80%, 40% and 75%, 40% and 70%, 40% and 65%, 40% and 60%, 40% and 55%, 40% and 50%, 40% and 45%, 45% and 95%, 45% and 90%, 45% and 85%, 45% and 80%, 45% and 75%, 45% and 70%, 45% and 65%, 45% and 60%, 45% and 55%, 45% and 50%, 50% and 90%, 50% and 90%, 50% and 85%, 50% and 80%, 50% and 75%, 50% and 70%, 50% and 65%, 50% and 60%, 50% and 55%, 55% and 95%, 55% and 90%, 55% and 85%, 55% and 80%, 55% and 75%, 55% and 70%, 55% and 65%, 55% and 60%, 60% and 95%, 60% and 90%, 60% and 85%, 60% and 80%, 60% and 75%, 60% and 70%, 60% and 65%, 65% and 95%, 65% and 90%, 65% and 85%, 65% and 80%, 65% and 75%, 65% and 70%, 70% and 95%, 70% and 90%, 70% and 85%, 70% and 80%, 70% and 75%, 75% and 95%, 75% and 90%, 75% and 85%, 75% and 80%, 80% and 95%, 80% and 90%, 80% and 85%, 85% and 95%, or between 85% and 90%.

Preferably, the weight content of compound(s) C in the composition is between 5% and 70%, preferentially between 5% and 60%, advantageously between 5% and 55%.

Preferably, the weight content of compound(s) C in the composition is between 5% and 90%, preferentially between 5% and 85%, advantageously between 60% and 85%, or between 5% and 40%.

According to one embodiment, the weight content of compound(s) C in the composition is greater than or equal to 5%, preferably greater than or equal to 10%, preferably greater than or equal to 15%, advantageously greater than or equal to 20%, for example greater than or equal to 25%, preferentially greater than or equal to 30%, notably greater than or equal to 40%, or even, for example, greater than or equal to 45%. It is, for example, greater than or equal to 50%, preferably greater than or equal to 55%, preferentially greater than or equal to 60%, advantageously greater than or equal to 70%, for example greater than or equal to 80%.

Preferably, the weight content of compound(s) C in the composition is chosen from one of the following contents: 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight relative to the total weight of the composition.

According to one embodiment, the abovementioned composition comprises (preferably consists essentially of, and preferentially consists of):
from 5% to 95% by weight, preferably from 10% to 90% by weight, of trifluoroethylene (R1123);
from 5% to 95%, preferably from 10% to 90%, by weight of pentafluoroethane (HFC-125); and
from 5% to 95%, preferably from 10% to 90%, by weight of at least one compound C as defined above, said compound C preferably being chosen from the group constituted by 1,1,1,2-tetrafluoroethane (HFC-134a), 2,3,3,3-tetrafluoropropene (HFO-1234yf), and mixtures thereof.

Preferably, the abovementioned composition comprises (preferably consists essentially of, and preferentially consists of):
from 10% to 80%, preferably from 10% to 70%, by weight of trifluoroethylene (R1123);
from 10% to 80%, preferably from 10% to 70%, by weight of pentafluoroethane (HFC-125); and
from 5% to 95%, preferably from 5% to 70%, by weight of at least one compound C as defined above, said compound C preferably being chosen from the group constituted by 1,1,1,2-tetrafluoroethane (HFC-134a), 2,3,3,3-tetrafluoropropene (HFO-1234yf), and mixtures thereof.

Preferably, the abovementioned composition comprises (preferably consists essentially of, and preferentially consists of):
from 10% to 55% by weight of trifluoroethylene (R1123);
from 10% to 55% by weight of pentafluoroethane (HFC-125); and
from 10% to 80% by weight of at least one compound C as defined above, said compound C preferably being chosen from the group constituted by 1,1,1,2-tetrafluoroethane (HFC-134a), 2,3,3,3-tetrafluoropropene (HFO-1234yf), and mixtures thereof.

Preferably, the abovementioned composition comprises (preferably consists essentially of, and preferentially consists of):
from 10% to 55% by weight of trifluoroethylene (R1123);
from 10% to 55% by weight of pentafluoroethane (HFC-125); and
from 5% to 55% by weight of at least one compound C as defined above, said compound C preferably being chosen from the group constituted by 1,1,1,2-tetrafluoroethane (HFC-134a), 2,3,3,3-tetrafluoropropene (HFO-1234yf), and mixtures thereof.

Preferably, the abovementioned composition comprises (preferably consists essentially of, and preferentially consists of):
from 5% to 35% by weight of trifluoroethylene (R1123);
from 1% to 10% by weight of pentafluoroethane (HFC-125); and
from 60% to 90% by weight of at least one compound C as defined above, said compound C preferably being chosen from the group constituted by 1,1,1,2-tetrafluoroethane (HFC-134a), 2,3,3,3-tetrafluoropropene (HFO-1234yf), and mixtures thereof.

The compositions according to the invention may be prepared via any known process, for instance by simple mixing of the different compounds with each other.

The compositions according to the invention advantageously have a GWP of less than 2000, preferably less than or equal to 1500, in particular less than or equal to 1000, for example less than or equal to 500, preferably less than or equal to 200, in particular less than or equal to 150. The GWP may be calculated according to the instructions given in the 4th report of the Intergovernmental Panel on Climate Change (IPCC). The GWP of the mixtures is in particular calculated as a function of the mass concentration and the GWP of each component. The GWP values of the pure compounds are typically listed in the European F-Gas Directive (Regulation (EU) No. 517/2014 of the European Parliament and of the Council, of Apr. 16, 2014).

The compositions according to the invention are advantageously heat-stable, alone or in combination with additives such as lubricants.

The compositions according to the invention are advantageously nonflammable or only slightly flammable.

According to the invention, the compositions advantageously have a lower flammability limit of greater than 200 g/m$^3$.

Preferably, the compositions advantageously result in a WCFF composition having a lower flammability limit of greater than 230 g/m$^3$, preferably of greater than or equal to 250 g/m$^3$, in particular of greater than or equal to 280 g/m$^3$.

Preferred compositions, and the corresponding WCFs and WCFFs, have a heat of combustion (HOC) of less than 19 000 kJ/m$^3$. The heat of combustion according to the invention is defined and determined as indicated in the standard ASHRAE 34-2013.

The "lower flammability limit" is defined in the standard ASHRAE 34-2013 as being the minimum concentration of a composition capable of propagating a flame through a homogeneous mixture of the composition and of air, under test conditions specified in the standard ASTM E681-04. It can be given, for example, in kg/m$^3$ or in % vol.

A "WCF" (worst case of formulation for flammability) composition is defined in the standard ASHRAE 34-2013 as being a composition of formulation for which the flame propagation rate is the highest. This composition is very close to the nominal composition (said nominal composition corresponding, in the context of the invention, to a composition according to the invention) with a degree of tolerance.

A "WCFF" (worst case of fractionation for flammability) composition is defined in the standard ASHRAE 34-2013 as being the composition, the flame propagation rate of which is the highest. This composition is determined following a method well defined in the same standard.

In the context of the present invention, the flammability, the flame propagation rate and the lower flammability limit are defined and determined according to the test given in the standard ASHRAE 34-2013, which refers to the standard ASTM E681 as to the equipment used.

As regards the flame propagation rate, the method of the tests described in the standard ASHRAE 34-2013 is that developed in the thesis by T. Jabbour, "Classification de l'inflammabilité des fluides frigorigènes basée sur la vitesse fondamentale de flamme" [Classification of the flammability of refrigerants based on the fundamental flame velocity] under the direction of Denis Clodic. Thesis, Paris, 2004. The experimental device uses in particular the vertical glass tube method (tube number 2, length 150 cm, diameter 40 cm). The use of two tubes makes it possible to perform two tests with the same concentration at the same time. The tubes are notably equipped with tungsten electrodes; these electrodes are placed at the bottom of each tube, 6.35 mm (¼ inch) apart, and are connected to a 15 kV and 30 mA generator.

The different compositions tested are described as non-flammable or flammable as such, according to the criteria defined in the standard ASHRAE 34-2013.

Preferred compositions advantageously have a flame propagation rate of less than 10 cm/s, preferably of less than or equal to 8 cm/s, preferentially of less than or equal to 6 cm/s, advantageously of less than or equal to 5 cm/s, very advantageously of less than or equal to 4 cm/s, less than or equal to 3 cm/s, less than or equal to 2 cm/s, less than or equal to 1.5 cm/s.

Preferred compositions are advantageously classified as 2L according to the standard ASHRAE 34-2013. Following this standard, the 2L classification requires a flame propagation rate of less than 10 cm/s.

Preferred compositions advantageously have a good compromise between good energy performance qualities, low or zero flammability and low GWP, preferably a GWP of less than 200.

Due to their low flammability, the preferred compositions are advantageously safer when they are used as heat-transfer fluids in refrigeration and air conditioning and for heating. In addition, heat-transfer installations (refrigeration, air conditioning, heat pump, and the like) may advantageously comprise higher loads of composition according to the invention, due to their low flammability. As regards the load limits, reference may typically be made to the standard EN378 published in 2008-2009.

R1123/HFC-125/HFC-134a

According to a preferred embodiment, compound C as defined above is 1,1,1,2-tetrafluoroethane (HFC-134a).

The composition according to the invention may comprise (preferably may consist essentially of, preferentially may consist of):

trifluoroethylene (R1123);
pentafluoroethane (HFC-125); and
1,1,1,2-tetrafluoroethane (HFC-134a).

Preferably, the weight content of trifluoroethylene (R1123) in the composition is, for example, between 5% and 60%, 5% and 55%, 5% and 50%, 5% and 45%, 5% and 40%, 5% and 35%, 5% and 30%, 5% and 25%, 5% and 20%, 5% and 15%, 5% and 10%, 10% and 60%, 10% and 55%, 10% and 50%, 10% and 45%, 10% and 40%, 10% and 35%, 10% and 30%, 10% and 25%, 10% and 20%, 10% and 15%, 15% and 60%, 15% and 55%, 15% and 50%, 15% and 45%, 15% and 40%, 15% and 35%, 15% and 30%, 15% and 25%, 15% and 20%, 20% and 60%, 20% and 55%, 20% and 50%, 20% and 45%, 20% and 40%, 20% and 35%, 20% and 30%, 20% and 25%, 25% and 60%, 25% and 55%, 25% and 50%, 25% and 45%, 25% and 40%, 25% and 35%, 25% and 30%, 30% and 60%, 30% and 55%, 30% and 50%, 30% and 45%, 30% and 40%, 30% and 35%, 35% and 60%, 35% and 55%, 35% and 50%, 35% and 45%, 35% and 40%, 40% and 60%, 40% and 55%, 40% and 50%, 40% and 45%, 45% and 60%, 45% and 55%, 45% and 50%, 50% and 60%, 50% and 55%, or between 55% and 60%. Preferably, the weight content of trifluoroethylene (R1123) in the composition is between 10% and 70%, preferentially between 10% and 60%, advantageously between 10% and 55%.

According to one embodiment, the weight content of trifluoroethylene (R1123) in the composition is greater than or equal to 5%, preferably greater than or equal to 10%, preferably greater than or equal to 15%, advantageously greater than or equal to 20%, for example greater than or equal to 25%, preferentially greater than or equal to 30%.

Preferably, the weight content of trifluoroethylene (R1123) in the composition is chosen from one of the following contents: 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

The weight content of pentafluoroethane (HFC-125) in the composition may be, for example, between 10% and 60%, 10% and 55%, 10% and 50%, 10% and 45%, 10% and 40%, 10% and 35%, 10% and 30%, 10% and 25%, 10% and 20%, 15% and 60%, 15% and 55%, 15% and 50%, 15% and 45%, 15% and 40%, 15% and 35%, 15% and 30%, 15% and 25%, 15% and 20%, 20% and 60%, 20% and 55%, 20% and 50%, 20% and 45%, 20% and 40%, 20% and 35%, 20% and 30%, 20% and 25%, 25% and 60%, 25% and 55%, 25% and 50%, 25% and 45%, 25% and 40%, 25% and 35%, 25% and 30%, 30% and 60%, 30% and 55%, 30% and 50%, 30% and 45%, 30% and 40%, 30% and 35%, 35% and 60%, 35% and 55%, 35% and 50%, 35% and 45%, 35% and 40%, 40% and 60%, 40% and 55%, 40% and 50%, 40% and 45%, 45% and 60%, 45% and 55%, 45% and 50%, 50% and 60%, 50% and 55%, or between 55% and 60%. Preferably, the weight content of pentafluoroethane (HFC-125) in the composition is between 10% and 70%, preferentially between 10% and 60%, advantageously between 10% and 55%, in particular between 20% and 55%.

According to one embodiment, the weight content of pentafluoroethane (HFC-125) in the composition is greater than or equal to 10%, preferably greater than or equal to 15%, preferably greater than or equal to 20%, advantageously greater than or equal to 25%, for example greater than or equal to 30%, preferentially greater than or equal to 35%.

Preferably, the weight content of pentafluoroethane (HFC-125) in the composition is chosen from one of the following contents: 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

The weight content of 1,1,1,2-tetrafluoroethane (HFC-134a) in the composition may be, for example, between 5% and 70%, 5% and 65%, 5% and 60%, 5% and 55%, 5% and 50%, 5% and 45%, 5% and 40%, 5% and 35%, 5% and 30%, 5% and 25%, 5% and 20%, 5% and 15%, 5% and 10%, 10% and 70%, 10% and 65%, 10% and 60%, 10% and 55%, 10% and 50%, 10% and 45%, 10% and 40%, 10% and 35%, 10% and 30%, 10% and 25%, 10% and 20%, 10% and 15%, 15% and 70%, 15% and 65%, 15% and 60%, 15% and 55%, 15% and 50%, 15% and 45%, 15% and 40%, 15% and 35%, 15% and 30%, 15% and 25%, 15% and 20%, 20% and 70%, 20% and 65%, 20% and 60%, 20% and 55%, 20% and 50%, 20% and 45%, 20% and 40%, 20% and 35%, 20% and 30%, 20% and 25%, 25% and 70%, 25% and 65%, 25% and 60%, 25% and 55%, 25% and 50%, 25% and 45%, 25% and 40%, 25% and 35%, 25% and 30%, 30% and 70%, 30% and 65%, 30% and 60%, 30% and 55%, 30% and 50%, 30% and 45%, 30% and 40%, 30% and 35%, 35% and 70%, 35% and 65%, 35% and 60%, 35% and 55%, 35% and 50%, 35% and 45%, 35% and 40%, 40% and 70%, 40% and 65%, 40% and 60%, 40% and 55%, 40% and 50%, 40% and 45%, 45% and 70%, 45% and 65%, 45% and 60%, 45% and 55%, 45% and 50%, 50% and 70%, 50% and 65%, 50% and 60%, 50% and 55%, 55% and 70%, 55% and 65%, 55% and 60%, 60% and 70%, 60% and 65%, or between 65% and 70%. Preferably, the weight content of 1,1,1,2-tetrafluoroethane (HFC-134a) in the composition is between 5% and 70%, preferentially between 5% and 60%, advantageously between 5% and 55%.

According to one embodiment, the weight content of 1,1,1,2-tetrafluoroethane (HFC-134a) in the composition is greater than or equal to 5%, preferably greater than or equal to 10%, preferably greater than or equal to 15%, advantageously greater than or equal to 20%, for example greater than or equal to 25%, preferentially greater than or equal to 30%, notably greater than or equal to 40%, or even, for example, greater than or equal to 45%.

Preferably, the weight content of 1,1,1,2-tetrafluoroethane (HFC-134a) in the composition is chosen from one of the following contents: 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

Preferably, the abovementioned composition comprises (preferably consists essentially of, and preferentially consists of):
from 10% to 55% by weight of trifluoroethylene (R1123);
from 10% to 55% by weight of pentafluoroethane (HFC-125); and
from 5% to 60% by weight of 1,1,1,2-tetrafluoroethane (HFC-134a).

Preferably, the abovementioned composition comprises (preferably consists essentially of, and preferentially consists of):
from 10% to 30%, preferably from 10% to 20%, by weight of trifluoroethylene (R1123);
from 20% to 50% by weight of pentafluoroethane (HFC-125); and
from 30% to 60% by weight of 1,1,1,2-tetrafluoroethane (HFC-134a).

Preferably, the abovementioned composition comprises (preferably consists essentially of, and preferentially consists of):
from 20% to 55%, preferably from 20% to 45%, by weight of trifluoroethylene (R1123);
from 20% to 45% by weight of pentafluoroethane (HFC-125); and
from 30% to 60% by weight of 1,1,1,2-tetrafluoroethane (HFC-134a).

Preferably, the abovementioned composition comprises (preferably consists essentially of, and preferentially consists of):
from 30% to 55% by weight of trifluoroethylene (R1123);
from 20% to 50% by weight of pentafluoroethane (HFC-125); and
from 10% to 50% by weight of 1,1,1,2-tetrafluoroethane (HFC-134a).

Preferably, the abovementioned composition comprises (preferably consists essentially of, and preferentially consists of):
from 40% to 55% by weight of trifluoroethylene (R1123);
from 30% to 55% by weight of pentafluoroethane (HFC-125); and
from 5% to 30% by weight of 1,1,1,2-tetrafluoroethane (HFC-134a).

According to one embodiment, the abovementioned compositions have a GWP of less than 2000, preferably less than or equal to 1500, in particular less than or equal to 1000.

The abovementioned compositions are advantageously nonflammable or only slightly flammable.

The compositions advantageously have a good compromise between good energy performance qualities, low or zero flammability and low GWP, preferably a GWP of less than 2000.

R1123/HFC-125/HFO-1234yf

According to a preferred embodiment, compound C as defined above is 2,3,3,3-tetrafluoropropene (HFO-1234yf).

The composition according to the invention may comprise (preferably may consist essentially of, preferentially may consist of):
trifluoroethylene (R1123);
pentafluoroethane (HFC-125); and
2,3,3,3-tetrafluoropropene (HFO-1234yf).

The weight content of trifluoroethylene (R1123) in the composition may be, for example, between 10% and 50%, 10% and 45%, 10% and 40%, 10% and 35%, 10% and 30%, 10% and 25%, 10% and 20%, 10% and 15%, 15% and 50%, 15% and 45%, 15% and 40%, 15% and 35%, 15% and 30%, 15% and 25%, 15% and 20%, 20% and 50%, 20% and 45%, 20% and 40%, 20% and 35%, 20% and 30%, 20% and 25%, 25% and 50%, 25% and 45%, 25% and 40%, 25% and 35%, 25% and 30%, 30% and 50%, 30% and 45%, 30% and 40%, 30% and 35%, 35% and 50%, 35% and 45%, 35% and 40%, 40% and 50%, 40% and 45%, or between 45% and 50%. Preferably, the weight content of trifluoroethylene (R1123) in the composition is between 10% and 70%, preferentially between 10% and 60%, advantageously between 10% and 55%, for example between 10% and 40% or between 15% and 35%.

According to one embodiment, the weight content of trifluoroethylene (R1123) in the composition is greater than or equal to 5%, preferably greater than or equal to 10%, preferably greater than or equal to 15%, advantageously greater than or equal to 20%, for example greater than or equal to 25%, preferentially greater than or equal to 30%.

Preferably, the weight content of trifluoroethylene (R1123) in the composition is chosen from one of the following contents: 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% by weight relative to the total weight of the composition.

The weight content of pentafluoroethane (HFC-125) in the composition may be, for example, between 1% and 20%, 1% and 15%, 1% and 10%, 1% and 5%, 2% and 20%, 2% and 15%, 2% and 10%, 2% and 5%, 3% and 20%, 3% and 15%, 3% and 10%, 3% and 5%, 4% and 20%, 4% and 15%, 4% and 10%, 4% and 5%, 5% and 20%, 5% and 15%, or between 5% and 10%.

Preferably, the weight content of pentafluoroethane (HFC-125) in the composition is between 1% and 15%, preferentially between 1% and 10%, advantageously between 1% and 5%, in particular between 1% and 4%.

According to one embodiment, the weight content of pentafluoroethane (HFC-125) in the composition is greater than or equal to 1%, preferably less than or equal to 10%, preferably less than or equal to 8%, advantageously less than or equal to 7%, for example less than or equal to 5%.

Preferably, the weight content of pentafluoroethane (HFC-125) in the composition is chosen from one of the following contents: 1%, 2%, 3%, 4%, 5%, 6%, 7%, 8%, 9%, and 10% by weight relative to the total weight of the composition.

The weight content of 2,3,3,3-tetrafluoropropene (HFO-1234yf) in the composition may be, for example, between 50% and 99%, 55% and 99%, 60% and 99%, 65% and 99%, 70% and 99%, 75% and 99%, 80% and 99%, 85% and 99%, 90% and 99%, 50% and 95%, 55% and 95%, 60% and 95%, 65% and 95%, 70% and 95%, 75% and 95%, 80% and 95%, 85% and 95%, 90% and 95%, 50% and 90%, 55% and 90%, 60% and 90%, 65% and 90%, 70% and 90%, 75% and 90%, 80% and 90%, 85% and 90%, 50% and 85%, 55% and 85%, 60% and 85%, 65% and 85%, 70% and 85%, 75% and 85%, 80% and 85%, 50% and 80%, 55% and 80%, 60% and 80%, 65% and 80%, 70% and 80%, 75% and 80%, 50% and 75%, 55% and 75%, 60% and 75%, 65% and 75%, or between 70% and 75%. Preferably, the weight content of 2,3,3,3-tetrafluoropropene (HFO-1234yf) in the composition is between 50% and 95%, preferentially between 50% and 90%, advantageously between 60% and 90%, for example between 60% and 85%.

According to one embodiment, the weight content of 2,3,3,3-tetrafluoropropene (HFO-1234yf) in the composition is greater than or equal to 50%, preferably greater than or equal to 60%, preferably greater than or equal to 65%, advantageously greater than or equal to 70%, for example greater than or equal to 75%, preferentially greater than or equal to 80%, notably greater than or equal to 85%.

Preferably, the weight content of 2,3,3,3-tetrafluoropropene (HFO-1234yf) in the composition is chosen from one of the following contents: 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 79%, 80%, 81%, 82%, 83%, 84%, 85%, 86%, 87%, 88%, 89%, 90%, 91%, 92%, 93%, 94%, 95%, 96%, 97%, 98%, or 99% by weight relative to the total weight of the composition.

According to one embodiment, the abovementioned composition comprises (preferably consists essentially of, and preferentially consists of):
from 1% to 50% by weight of trifluoroethylene (R1123);
from 1% to 20% by weight of pentafluoroethane (HFC-125); and
from 50% to 98% by weight of 2,3,3,3-tetrafluoropropene (HFO-1234yf).

Preferably, the abovementioned composition comprises (preferably consists essentially of, and preferentially consists of):
from 5% to 50% by weight of trifluoroethylene (R1123);
from 1% to 10% by weight of pentafluoroethane (HFC-125); and
from 50% to 90% by weight of 2,3,3,3-tetrafluoropropene (HFO-1234yf).

Preferably, the abovementioned composition comprises (preferably consists essentially of, and preferentially consists of):
from 10% to 40% by weight of trifluoroethylene (R1123);
from 1% to 5% by weight of pentafluoroethane (HFC-125); and
from 55% to 85% by weight of 2,3,3,3-tetrafluoropropene (HFO-1234yf).

Preferably, the abovementioned composition comprises (preferably consists essentially of, and preferentially consists of):
from 15% to 35% by weight of trifluoroethylene (R1123);
from 1% to 5% by weight of pentafluoroethane (HFC-125); and
from 60% to 84% by weight of 2,3,3,3-tetrafluoropropene (HFO-1234yf).

Preferred abovementioned compositions have a GWP of less than 200, preferably less than or equal to 150.

The abovementioned compositions are advantageously nonflammable or only slightly flammable.

The compositions advantageously have a lower flammability limit of greater than 200 g/m$^3$.

The abovementioned compositions advantageously result in a WCFF composition having a lower flammability limit of greater than 230 g/m$^3$, preferably of greater than or equal to 250 g/m$^3$, in particular of greater than or equal to 280 g/m$^3$.

Preferred compositions, and the corresponding WCFs and WCFFs, have a heat of combustion (HOC) of less than 19 000 kJ/m$^3$. The heat of combustion according to the invention is defined and determined as indicated in the standard ASHRAE 34-2013.

The compositions advantageously have a flame propagation rate of less than 10 cm/s, preferably of less than or equal to 8 cm/s, preferentially of less than or equal to 6 cm/s, advantageously of less than or equal to 5 cm/s, very advantageously of less than or equal to 4 cm/s, less than or equal to 3 cm/s, less than or equal to 2 cm/s, less than or equal to 1.5 cm/s.

Preferred compositions are advantageously classified as 2L according to the standard ASHRAE 34-2013. Following this standard, the 2L classification requires a flame propagation rate of less than 10 cm/s.

The compositions advantageously have a good compromise between good energy performance qualities, low or zero flammability and low GWP, preferably a GWP of less than 200.

R1123/HFC-125/HFC-134a/HFO-1234yf

According to a preferred embodiment, the composition according to the invention comprises two compounds: 1,1,1,2-tetrafluoroethane (HFC-134a) and 2,3,3,3-tetrafluoropropene (HFO-1234yf).

The composition according to the invention may comprise (preferably may consist essentially of, preferentially may consist of):
trifluoroethylene (R1123);
pentafluoroethane (HFC-125);
1,1,1,2-tetrafluoroethane (HFC-134a); and
2,3,3,3-tetrafluoropropene (HFO-1234yf).

The weight content of trifluoroethylene (R1123) in the composition may be, for example, between 5% and 60%, 5% and 55%, 5% and 50%, 5% and 45%, 5% and 40%, 5% and 35%, 5% and 30%, 5% and 25%, 5% and 20%, 5% and 15%, 5% and 10%, 10% and 60%, 10% and 55%, 10% and 50%, 10% and 45%, 10% and 40%, 10% and 35%, 10% and 30%, 10% and 25%, 10% and 20%, 10% and 15%, 15% and 60%, 15% and 55%, 15% and 50%, 15% and 45%, 15% and 40%, 15% and 35%, 15% and 30%, 15% and 25%, 15% and 20%, 20% and 60%, 20% and 55%, 20% and 50%, 20% and 45%, 20% and 40%, 20% and 35%, 20% and 30%, 20% and 25%, 25% and 60%, 25% and 55%, 25% and 50%, 25% and 45%, 25% and 40%, 25% and 35%, 25% and 30%, 30% and 60%, 30% and 55%, 30% and 50%, 30% and 45%, 30% and 40%, 30% and 35%, 35% and 60%, 35% and 55%, 35% and 50%, 35% and 45%, 35% and 40%, 40% and 60%, 40% and 55%, 40% and 50%, 40% and 45%, 45% and 60%, 45% and 55%, 45% and 50%, 50% and 60%, 50% and 55%, or between 55% and 60%. Preferably, the weight content of trifluoroethylene (R1123) in the composition is between 5% and 70%, preferentially between 5% and 60%, advantageously between 5% and 55%.

According to one embodiment, the weight content of trifluoroethylene (R1123) in the composition is greater than or equal to 5%, preferably greater than or equal to 10%, preferably greater than or equal to 15%, advantageously greater than or equal to 20%, for example greater than or equal to 25%, preferentially greater than or equal to 30%.

Preferably, the weight content of trifluoroethylene (R1123) in the composition is chosen from one of the following contents: 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

The weight content of pentafluoroethane (HFC-125) in the composition may be, for example, between 5% and 60%, 5% and 55%, 5% and 50%, 5% and 45%, 5% and 40%, 5% and 35%, 5% and 30%, 5% and 25%, 5% and 20%, 10% and 60%, 10% and 55%, 10% and 50%, 10% and 45%, 10% and 40%, 10% and 35%, 10% and 30%, 10% and 25%, 10% and 20%, 15% and 60%, 15% and 55%, 15% and 50%, 15% and 45%, 15% and 40%, 15% and 35%, 15% and 30%, 15% and 25%, 15% and 20%, 20% and 60%, 20% and 55%, 20% and 50%, 20% and 45%, 20% and 40%, 20% and 35%, 20% and 30%, 20% and 25%, 25% and 60%, 25% and 55%, 25% and 50%, 25% and 45%, 25% and 40%, 25% and 35%, 25% and 30%, 30% and 60%, 30% and 55%, 30% and 50%, 30% and 45%, 30% and 40%, 30% and 35%, 35% and 60%, 35% and 55%, 35% and 50%, 35% and 45%, 35% and 40%, 40% and 60%, 40% and 55%, 40% and 50%, 40% and 45%, 45% and 60%, 45% and 55%, 45% and 50%, 50% and 60%, 50% and 55%, or between 55% and 60%. Preferably, the weight content of pentafluoroethane (HFC-125) in the composition is between 10% and 70%, preferentially between 10% and 60%, advantageously between 10% and 55%, in particular between 20% and 55%.

According to one embodiment, the weight content of pentafluoroethane (HFC-125) in the composition is greater than or equal to 5%, preferably greater than or equal to 10%, preferably greater than or equal to 15%, advantageously greater than or equal to 20%, for example greater than or equal to 25%, preferentially greater than or equal to 30%.

Preferably, the weight content of pentafluoroethane (HFC-125) in the composition is chosen from one of the following contents: 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

The weight content of 1,1,1,2-tetrafluoroethane (HFC-134a) in the composition may be, for example, between 1% and 50%, 1% and 45%, 1% and 40%, 1% and 35%, 1% and 30%, 1% and 25%, 1% and 20%, 1% and 15%, 1% and 10%, 1% and 5%, 2% and 50%, 2% and 45%, 2% and 40%, 2% and 35%, 2% and 30%, 2% and 25%, 2% and 20%, 2% and 15%, 2% and 10%, 2% and 5%, 3% and 50%, 3% and 45%, 3% and 40%, 3% and 35%, 3% and 30%, 3% and 25%, 3% and 20%, 3% and 15%, 3% and 10%, 3% and 5%, 4% and 50%, 4% and 45%, 4% and 40%, 4% and 35%, 4% and 30%, 4% and 25%, 4% and 20%, 4% and 15%, 4% and 10%, 4% and 5%, 5% and 50%, 5% and 45%, 5% and 40%, 5% and 35%, 5% and 30%, 5% and 25%, 5% and 20%, 5% and 15%, 5% and 10%, 10% and 50%, 10% and 45%, 10% and 40%, 10% and 35%, 10% and 30%, 10% and 25%, 10% and 20%, 10% and 15%, 15% and 50%, 15% and 45%, 15% and 40%, 15% and 35%, 15% and 30%, 15% and 25%, 15% and 20%, 20% and 50%, 20% and 45%, 20% and 40%, 20% and 35%, 20% and 30%, 20% and 25%, 25% and 50%, 25% and 45%, 25% and 40%, 25% and 35%, 25% and 30%, 30% and 50%, 30% and 45%, 30% and 40%, 30% and 35%, 40% and 50%, or between 40% and 45%.

Preferably, the weight content of 1,1,1,2-tetrafluoroethane (HFC-134a) in the composition is between 5% and 50%, preferentially between 5% and 45%, advantageously between 5% and 40%.

According to one embodiment, the weight content of 1,1,1,2-tetrafluoroethane (HFC-134a) in the composition is greater than or equal to 5%, preferably greater than or equal to 10%, preferably greater than or equal to 15%, advantageously greater than or equal to 20%, for example greater than or equal to 25%, preferentially greater than or equal to 30%, notably greater than or equal to 40%.

Preferably, the weight content of 1,1,1,2-tetrafluoroethane (HFC-134a) in the composition is chosen from one of the following contents: 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, or 50% by weight relative to the total weight of the composition.

The weight content of 2,3,3,3-tetrafluoropropene (HFO-1234yf) in the composition may be, for example, between 1% and 60%, 1% and 50%, 1% and 45%, 1% and 40%, 1% and 35%, 1% and 30%, 1% and 25%, 1% and 20%, 1% and 15%, 1% and 10%, 1% and 5%, 2% and 50%, 2% and 45%, 2% and 40%, 2% and 35%, 2% and 30%, 2% and 25%, 2% and 20%, 2% and 15%, 2% and 10%, 2% and 5%, 3% and 50%, 3% and 45%, 3% and 40%, 3% and 35%, 3% and 30%, 3% and 25%, 3% and 20%, 3% and 15%, 3% and 10%, 3% and 5%, 4% and 50%, 4% and 45%, 4% and 40%, 4% and 35%, 4% and 30%, 4% and 25%, 4% and 20%, 4% and 15%, 4% and 10%, 4% and 5%, 5% and 50%, 5% and 45%, 5% and 40%, 5% and 35%, 5% and 30%, 5% and 25%, 5% and 20%, 5% and 15%, 5% and 10%, 10% and 50%, 10% and 45%, 10% and 40%, 10% and 35%, 10% and 30%, 10% and 25%, 10% and 20%, 10% and 15%, 15% and 50%, 15% and 45%, 15% and 40%, 15% and 35%, 15% and 30%, 15% and 25%, 15% and 20%, 20% and 50%, 20% and 45%, 20% and 40%, 20% and 35%, 20% and 30%, 20% and 25%, 25% and 50%, 25% and 45%, 25% and 40%, 25% and 35%, 25% and 30%, 30% and 50%, 30% and 45%, 30% and 40%, 30% and 35%, 40% and 50%, or between 40% and 45%. Preferably, the weight content of 2,3,3,3-tetrafluoropropene (HFO-1234yf) in the composition is between 5% and 50%, preferentially between 5% and 45%, advantageously between 5% and 40%.

According to one embodiment, the weight content of 2,3,3,3-tetrafluoropropene (HFO-1234yf) in the composition is greater than or equal to 5%, preferably greater than or equal to 10%, preferably greater than or equal to 15%, advantageously greater than or equal to 20%, for example greater than or equal to 25%, preferentially greater than or equal to 30%, notably greater than or equal to 40%.

Preferably, the weight content of 2,3,3,3-tetrafluoropropene (HFO-1234yf) in the composition is chosen from one of the following contents: 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, or 60% by weight relative to the total weight of the composition.

According to one embodiment, the abovementioned composition comprises (preferably consists essentially of, and preferentially consists of):
from 5% to 60% by weight of trifluoroethylene (R1123);
from 5% to 60% by weight of pentafluoroethane (HFC-125);
from 1% to 50% by weight of 1,1,1,2-tetrafluoroethane (HFC-134a); and
from 1% to 60% by weight of 2,3,3,3-tetrafluoropropene (HFO-1234yf).

According to one embodiment, the abovementioned composition comprises (preferably consists essentially of, and preferentially consists of):
from 5% to 60% by weight of trifluoroethylene (R1123);
from 5% to 60% by weight of pentafluoroethane (HFC-125);
from 5% to 50% by weight of 1,1,1,2-tetrafluoroethane (HFC-134a); and
from 5% to 50% by weight of 2,3,3,3-tetrafluoropropene (HFO-1234yf).

According to one embodiment, the abovementioned composition comprises (preferably consists essentially of, and preferentially consists of):
from 5% to 55% by weight of trifluoroethylene (R1123);
from 10% to 55% by weight of pentafluoroethane (HFC-125);
from 5% to 40% by weight of 1,1,1,2-tetrafluoroethane (HFC-134a); and
from 5% to 40% by weight of 2,3,3,3-tetrafluoropropene (HFO-1234yf).

According to one embodiment, the abovementioned composition comprises (preferably consists essentially of, and preferentially consists of):
from 5% to 25% by weight of trifluoroethylene (R1123);
from 10% to 55% by weight of pentafluoroethane (HFC-125);
from 10% to 40% by weight of 1,1,1,2-tetrafluoroethane (HFC-134a); and
from 10% to 40% by weight of 2,3,3,3-tetrafluoropropene (HFO-1234yf).

According to one embodiment, the abovementioned composition comprises (preferably consists essentially of, and preferentially consists of):
from 30% to 55% by weight of trifluoroethylene (R1123);
from 20% to 55% by weight of pentafluoroethane (HFC-125);
from 5% to 20% by weight of 1,1,1,2-tetrafluoroethane (HFC-134a); and
from 5% to 20% by weight of 2,3,3,3-tetrafluoropropene (HFO-1234yf).

According to one embodiment, the abovementioned compositions have a GWP of less than 2000, preferably less than or equal to 1500, in particular less than or equal to 1000.

The abovementioned compositions are advantageously nonflammable or only slightly flammable.

The compositions advantageously have a good compromise between good energy performance qualities, low or zero flammability and low GWP, preferably a GWP of less than 2000.

Heat-Transfer Composition

According to one embodiment, the composition as defined above is a heat-transfer fluid.

The present invention also relates to a heat-transfer composition comprising (preferably consisting of) the composition according to the invention as defined above, and at least one additive notably chosen from nanoparticles, stabilizers, surfactants, tracing agents, fluorescent agents, odorous agents, lubricants and solubilizing agents. Preferably, the additive is chosen from lubricants and in particular lubricants based on polyol esters.

The term "heat-transfer compound" or, respectively, "heat-transfer fluid" or "refrigerant" refers to a compound or, respectively, a fluid, which is capable of absorbing heat by evaporating at low temperature and low pressure and of discharging heat by condensing at high temperature and high pressure, in a vapor compression circuit. Generally, a heat-transfer fluid may comprise just one, two, three or more than three heat-transfer compounds.

The term "heat-transfer composition" refers to a composition comprising a heat-transfer fluid and optionally one or more additives which are not heat-transfer compounds for the application envisaged.

The stabilizer(s), when they are present, preferably represent not more than 5% by mass in the heat-transfer composition. Mention may notably be made, among the stabilizers, of nitromethane, ascorbic acid, terephthalic acid, azoles, such as tolutriazole or benzotriazole, phenolic compounds, such as tocopherol, hydroquinone, (t-butyl)hydroquinone or 2,6-di(tert-butyl)-4-methylphenol, epoxides (alkyl, which is optionally fluorinated or perfluorinated, or alkenyl or aromatic), such as n-butyl glycidyl ether, hexanediol diglycidyl ether, allyl glycidyl ether or butylphenyl glycidyl ether, phosphites, phosphonates, thiols and lactones.

Use may in particular be made, as nanoparticles, of charcoal nanoparticles, metal (copper, aluminum) oxides, $TiO_2$, $Al_2O_3$, $MoS_2$, and the like.

Mention may be made, as tracing agents (agents capable of being detected), of deuterated or non-deuterated hydrofluorocarbons, deuterated hydrocarbons, perfluorocarbons, fluoroethers, brominated compounds, iodinated compounds, alcohols, aldehydes, ketones, nitrous oxide and the combinations of these. The tracing agent is different from the heat-transfer compound or compounds making up the heat-transfer fluid.

Mention may be made, as solubilizing agents, of hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizing agent is different from the heat-transfer compound or compounds making up the heat-transfer fluid.

Mention may be made, as fluorescent agents, of naphthalimides, perylenes, coumarins, anthracenes, phenanthracenes, xanthenes, thioxanthenes, naphthoxanthenes, fluoresceins and derivatives and combinations thereof.

Mention may be made, as odorous agents, of alkyl acrylates, allyl acrylates, acrylic acids, acryl esters, alkyl ethers, alkyl esters, alkynes, aldehydes, thiols, thioethers, disulfides, allyl isothiocyanates, alkanoic acids, amines, norbornenes, norbornene derivatives, cyclohexene, aromatic heterocyclic compounds, ascaridole, o-methoxy(methyl) phenol and the combinations of these.

In the context of the invention, the terms "lubricant" and "lubricating oil" are used equivalently.

Use may notably be made, as lubricants, of oils of mineral origin, silicone oils, paraffins of natural origin, naphthenes, synthetic paraffins, alkylbenzenes, poly($\alpha$-olefins), polyalkylene glycols, polyol esters and/or polyvinyl ethers.

According to one embodiment, the lubricant is based on polyol esters. In particular, the lubricant comprises one or more polyol ester(s).

According to one embodiment, the polyol esters are obtained by reaction of at least one polyol with a carboxylic acid or with a mixture of carboxylic acids.

In the context of the invention, the term "carboxylic acid" covers both a monocarboxylic and polycarboxylic acid, for instance a dicarboxylic acid.

In the context of the invention, and unless otherwise mentioned, the term "polyol" means a compound containing at least two hydroxyl (—OH) groups.

Polyol Esters A)

According to one embodiment, the polyol esters according to the invention correspond to the general formula (I) below:

$$R^1[OC(O)R^2]_{n\,p} \quad (I)$$

in which:

$R^1$ is a linear or branched hydrocarbon-based radical, optionally substituted with at least one hydroxyl group and/or comprising at least one heteroatom chosen from the group constituted by —O—, —N— and —S—;

each $R^2$ is, independently of each other, chosen from the group constituted by:
i) H;
ii) an aliphatic hydrocarbon-based radical;
iii) a branched hydrocarbon-based radical;
iv) a mixture of a radical ii) and/or iii), with an aliphatic hydrocarbon-based radical comprising from 8 to 14 carbon atoms; and n is an integer of at least 2.

In the context of the invention, the term "hydrocarbon-based radical" means a radical composed of carbon and hydrogen atoms.

According to one embodiment, the polyols have the general formula (II) below:

$$R^1(OH)_n \quad (II)$$

in which:

$R^1$ is a linear or branched hydrocarbon-based radical, optionally substituted with at least one hydroxyl group, preferably with two hydroxyl groups, and/or comprising at least one heteroatom chosen from the group constituted by —O—, —N— and —S—; and n is an integer of at least 2.

Preferably, $R^1$ is a linear or branched hydrocarbon-based radical comprising from 4 to 40 carbon atoms, preferably from 4 to 20 carbon atoms.

Preferably, $R^1$ is a linear or branched hydrocarbon-based radical comprising at least one oxygen atom.

Preferably, $R^1$ is a branched hydrocarbon-based radical comprising from 4 to 10 carbon atoms, preferably 5 carbon atoms, substituted with two hydroxyl groups.

According to a preferred embodiment, the polyols comprise from 2 to 10 hydroxyl groups, preferably from 2 to 6 hydroxyl groups.

The polyols according to the invention may comprise one or more oxyalkylene groups; in this specific case, they are polyether polyols.

The polyols according to the invention may also comprise one or more nitrogen atoms. For example, the polyols may be alkanolamines containing from 3 to 6 OH groups. Preferably, the polyols are alkanolamines containing at least two OH groups and preferably at least three.

According to the present invention, the preferred polyols are chosen from the group constituted by ethylene glycol, diethylene glycol, triethylene glycol, propylene glycol, dipropylene glycol, glycerol, neopentyl glycol, 1,2-butanediol, 1,4-butanediol, 1,3-butanediol, pentaerythritol, dipentaerythritol, tripentaerythritol, triglycerol, trimethylolpropane, sorbitol, hexaglycerol and mixtures thereof. Preferably, the polyol is pentaerythritol or dipentaerythritol.

According to the invention, the carboxylic acids may correspond to the general formula (III) below:

R²COOH (III)

in which:
R² is chosen from the group constituted by:
i) H;
ii) an aliphatic hydrocarbon-based radical;
iii) a branched hydrocarbon-based radical;
iv) a mixture of a radical ii) and/or iii), with an aliphatic hydrocarbon-based radical comprising from 8 to 14 carbon atoms.

Preferably, R² is an aliphatic hydrocarbon-based radical comprising from 1 to 10, preferentially from 1 to 7, carbon atoms and in particular from 1 to 6 carbon atoms.

Preferably, R² is a branched hydrocarbon-based radical comprising from 4 to 20 carbon atoms, in particular from 5 to 14 carbon atoms and preferentially from 6 to 8 carbon atoms.

According to a preferred embodiment, a branched hydrocarbon-based radical has the formula (IV) below:

—C(R³)R⁴)(R⁵) (IV)

in which R³, R⁴ and R⁵ are, independently of each other, an alkyl group, and at least one of the alkyl groups contains at least two carbon atoms. Such branched alkyl groups, once bonded to the carboxyl group, are known under the name "neo group" and the corresponding acid is known as a "neo acid". Preferably, R³ and R⁴ are methyl groups and R¹⁰ is an alkyl group comprising at least two carbon atoms.

According to the invention, the R² radical may comprise one or more carboxyl groups or ester groups such as —COOR⁶, with R⁶ representing an alkyl or hydroxyalkyl radical or a hydroxyalkyloxyalkyl group. Preferably, the acid R²COOH of formula (III) is a monocarboxylic acid.

Examples of carboxylic acids in which the hydrocarbon-based radical is aliphatic are notably: formic acid, acetic acid, propionic acid, butyric acid, pentanoic acid, hexanoic acid and heptanoic acid.

Examples of carboxylic acids in which the hydrocarbon-based radical is branched are notably: 2-ethyl-n-butyric acid, 2-hexyldecanoic acid, isostearic acid, 2-methylhexanoic acid, 2-methylbutanoic acid, 3-methylbutanoic acid, 3,5,5-trimethylhexanoic acid, 2-ethylhexanoic acid, neoheptanoic acid and neodecanoic acid.

The third type of carboxylic acids which may be used in the preparation of the polyol esters of formula (I) are carboxylic acids comprising an aliphatic hydrocarbon-based radical comprising from 8 to 14 carbon atoms. Mention may be made, for example, of: decanoic acid, dodecanoic acid, lauric acid, stearic acid, myristic acid, behenic acid, and the like. Among the dicarboxylic acids, mention may be made of maleic acid, succinic acid, adipic acid, sebacic acid, and the like.

According to a preferred embodiment, the carboxylic acids used to prepare the polyol esters of formula (I) comprise a mixture of monocarboxylic and dicarboxylic acids, the proportion of monocarboxylic acids being predominant. The presence of dicarboxylic acids results notably in the formation of high-viscosity polyol esters.

In particular, the reaction for the formation of the polyol esters of formula (I) by reaction between the carboxylic acid and the polyols is an acid-catalyzed reaction. It is notably a reversible reaction which may be completed by the use of a large amount of acid or by removal of the water formed during the reaction.

The esterification reaction may be performed in the presence of organic or inorganic acids, such as sulfuric acid, phosphoric acid, and the like.

Preferably, the reaction is performed in the absence of catalyst.

The amount of carboxylic acid and of polyol may vary in the mixture according to the desired results. In the specific case where all the hydroxyl groups are esterified, a sufficient amount of carboxylic acid must be added in order to react with all the hydroxyls.

According to one embodiment, during the use of mixtures of carboxylic acids, they can react sequentially with the polyols.

According to a preferred embodiment, during the use of a mixture of carboxylic acids, a polyol reacts first with a carboxylic acid, typically the carboxylic acid with the highest molecular weight, followed by the reaction with the carboxylic acid bearing an aliphatic hydrocarbon-based chain.

According to one embodiment, the esters may be formed by reaction between the carboxylic acids (or the anhydride or ester derivatives thereof) and the polyols, in the presence of acids at high temperature, while removing the water formed during the reaction. Typically, the reaction may be performed at a temperature of from 75 to 200° C.

According to another embodiment, the polyol esters formed can comprise hydroxyl groups which have not all reacted; in this case, they are partially esterified polyol esters.

According to a preferred embodiment, the polyol esters are obtained from the alcohol pentaerythritol and from a mixture of carboxylic acids: isononanoic acid, at least one acid bearing an aliphatic hydrocarbon-based radical comprising from 8 to 10 carbon atoms, and heptanoic acid. The preferred polyol esters are obtained from pentaerythritol and from a mixture of 70% isononanoic acid, 15% of at least one carboxylic acid bearing an aliphatic hydrocarbon-based radical comprising from 8 to 10 carbon atoms, and 15% heptanoic acid. Mention may be made, for example, of the oil Solest 68 sold by CPI Engineering Services Inc.

According to a preferred embodiment, the polyol esters are obtained from the alcohol dipentaerythritol and from a mixture of carboxylic acids: isononanoic acid, at least one acid bearing an aliphatic hydrocarbon-based radical comprising from 8 to 10 carbon atoms, and heptanoic acid.

Preferably, the polyol esters of the invention have one of the general formulae (I-A) and (I-B) below:

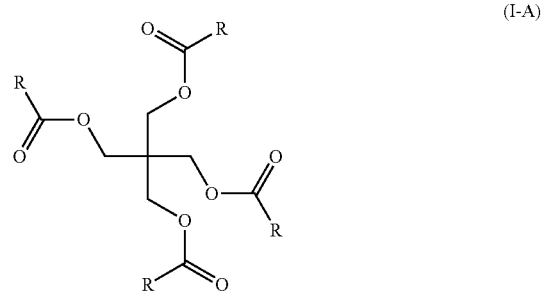

(I-A)

-continued

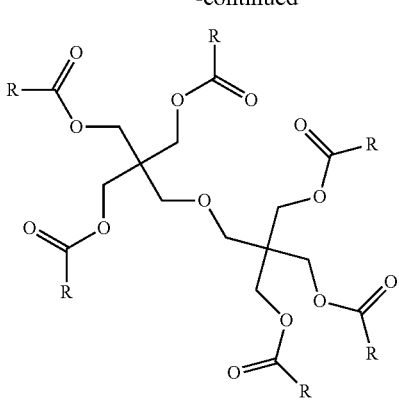

(I-B)

in which each R represents, independently of each other:
an aliphatic hydrocarbon-based radical comprising from 1 to 10, preferably from 2 to 9, preferentially from 4 to 9, carbon atoms and in particular from 1 to 6 carbon atoms.
a branched hydrocarbon-based radical comprising from 4 to 20 carbon atoms, in particular from 4 to 14 carbon atoms and preferentially from 4 to 9 carbon atoms.

In particular, the polyol esters of formula (I-A) or of formula (I-B) comprise different R radicals.

A preferred polyol ester is an ester of formula (I-A) in which R is chosen from:
an aliphatic hydrocarbon-based radical comprising 4 carbon atoms; and/or
an aliphatic hydrocarbon-based radical comprising 6 carbon atoms; and/or
an aliphatic hydrocarbon-based radical comprising 7 carbon atoms; and/or
an aliphatic hydrocarbon-based radical comprising 8 carbon atoms; and/or
an aliphatic hydrocarbon-based radical comprising 9 carbon atoms; and/or
a branched hydrocarbon-based radical comprising 4 carbon atoms; and/or
a branched hydrocarbon-based radical comprising 5 carbon atoms; and/or
a branched hydrocarbon-based radical comprising 7 carbon atoms; and/or
a branched hydrocarbon-based radical comprising 8 carbon atoms; and/or
a branched hydrocarbon-based radical comprising 9 carbon atoms.

A preferred polyol ester is an ester of formula (I-B) in which R is chosen from:
an aliphatic hydrocarbon-based radical comprising 4 carbon atoms; and/or
an aliphatic hydrocarbon-based radical comprising 6 carbon atoms; and/or
an aliphatic hydrocarbon-based radical comprising 7 carbon atoms; and/or
an aliphatic hydrocarbon-based radical comprising 8 carbon atoms; and/or
an aliphatic hydrocarbon-based radical comprising 9 carbon atoms; and/or
a branched hydrocarbon-based radical comprising 4 carbon atoms; and/or
a branched hydrocarbon-based radical comprising 5 carbon atoms; and/or
a branched hydrocarbon-based radical comprising 7 carbon atoms; and/or
a branched hydrocarbon-based radical comprising 8 carbon atoms; and/or
a branched hydrocarbon-based radical comprising 9 carbon atoms.

Polyol Esters B)

According to another embodiment, the polyol esters of the invention comprise at least one ester of one or more branched carboxylic acids comprising not more than 8 carbon atoms. The ester is notably obtained by reaction of said branched carboxylic acid with one or more polyols.

Preferably, the branched carboxylic acid comprises at least 5 carbon atoms. In particular, the branched carboxylic acid comprises from 5 to 8 carbon atoms and preferentially it contains 5 carbon atoms.

Preferably, the abovementioned branched carboxylic acid does not comprise 9 carbon atoms. In particular, said carboxylic acid is not 3,5,5-trimethylhexanoic acid.

According to a preferred embodiment, the branched carboxylic acid is chosen from 2-methylbutanoic acid, 3-methylbutanoic acid and mixtures thereof.

According to a preferred embodiment, the polyol is chosen from the group constituted by neopentyl glycol, glycerol, trimethylolpropane, pentaerythritol, dipentaerythritol, tripentaerythritol and mixtures thereof.

According to a preferred embodiment, the polyol esters are obtained from:
i) a carboxylic acid chosen from 2-methylbutanoic acid, 3-methylbutanoic acid and mixtures thereof; and
ii) a polyol chosen from the group constituted by neopentyl glycol, glycerol, trimethylolpropane, pentaerythritol, dipentaerythritol, tripentaerythritol and mixtures thereof.

Preferably, the polyol ester is that obtained from 2-methylbutanoic acid and pentaerythritol.
Preferably, the polyol ester is that obtained from 2-methylbutanoic acid and dipentaerythritol.
Preferably, the polyol ester is that obtained from 3-methylbutanoic acid and pentaerythritol.
Preferably, the polyol ester is that obtained from 3-methylbutanoic acid and dipentaerythritol.
Preferably, the polyol ester is that obtained from 2-methylbutanoic acid and neopentyl glycol.

Polyol Esters C)

According to another embodiment, the polyol esters according to the invention are poly(neopentyl polyol) esters obtained by:
i) reaction of a neopentyl polyol having the formula (V) below:

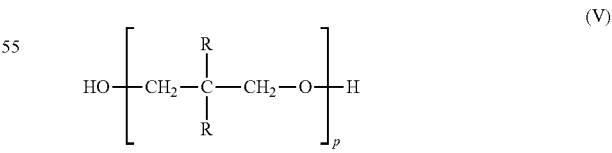

(V)

in which:
each R represents, independently of each other, $CH_3$, $C_2H_5$ or $CH_2OH$;
p is an integer ranging from 1 to 4;
with at least one monocarboxylic acid containing from 2 to 15 carbon atoms, and in the presence of an acid catalyst, the mole ratio of the carboxyl groups to the hydroxyl groups being less than 1:1, to form a partially esterified poly(neopentyl polyol) composition; and ii) reaction of the partially esterified poly(neopentyl polyol) composition obtained on conclusion of step i) with another carboxylic acid containing from 2 to 15 carbon atoms, to form the final poly(neopentyl polyol) ester composition.

Preferably, reaction i) is performed with a mole ratio ranging from 1:4 to 1:2.

Preferably, the neopentyl polyol has the formula (VI) below:

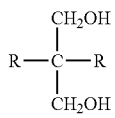

(VI)

in which each R represents, independently of each other, $CH_3$, $C_2H_5$ or $CH_2OH$.

Preferred neopentyl polyols are those chosen from pentaerythritol, dipentaerythritol, tripentaerythritol, tetraerythritol, trimethylolpropane, trimethylolethane and neopentyl glycol. In particular, the neopentyl polyol is pentaerythritol.

Preferably, only one neopentyl polyol is used to produce the POE-based lubricant. In some cases, two or more neopentyl polyols are used. This is notably the case when a commercial pentaerythritol product comprises small amounts of dipentaerythritol, tripentaerythritol and tetraerythritol.

According to a preferred embodiment, the abovementioned monocarboxylic acid comprises from 5 to 11 carbon atoms, preferably from 6 to 10 carbon atoms.

The monocarboxylic acids notably have the general formula (VII) below:

R'C(O)OH     (VII)

in which R' is a linear or branched C1-C12 alkyl radical, a C6-C12 aryl radical or a C6-C30 aralkyl radical. Preferably, R' is a C4-C10 and preferentially C5-C9 alkyl radical.

In particular, the monocarboxylic acid is chosen from the group constituted by butanoic acid, pentanoic acid, hexanoic acid, heptanoic acid, n-octanoic acid, n-nonanoic acid, n-decanoic acid, 2-methylbutanoic acid, 3-methylbutanoic acid, 2,4-dimethylpentanoic acid, 2-ethylhexanoic acid, 3,3,5-trimethylhexanoic acid, benzoic acid and mixtures thereof.

According to a preferred embodiment, the monocarboxylic acid is n-heptanoic acid or a mixture of n-heptanoic acid with another linear monocarboxylic acid, in particular n-octanoic acid and/or n-decanoic acid. Such a monocarboxylic acid mixture may comprise between 15 mol % and 100 mol % of heptanoic acid and between 85 mol % and 0 mol % of other monocarboxylic acid(s). In particular, the mixture comprises between 75 mol % and 100 mol % of heptanoic acid and between 25 mol % and 0 mol % of a mixture of octanoic acid and decanoic acid in a mole ratio of 3:2.

According to a preferred embodiment, the polyol esters comprise:

i) from 45% to 55% by weight of an ester of monopentaerythritol with at least one monocarboxylic acid containing from 2 to 15 carbon atoms;

ii) less than 13% by weight of an ester of dipentaerythritol with at least one monocarboxylic acid containing from 2 to 15 carbon atoms;

iii) less than 10% by weight of an ester of tripentaerythritol with at least one monocarboxylic acid containing from 2 to 15 carbon atoms; and iv) at least 25% by weight of an ester of tetraerythritol and of other oligomers of pentaerythritol with at least one monocarboxylic acid containing from 2 to 15 carbon atoms.

Polyol Esters D)

According to another embodiment, the polyol esters according to the invention have the formula (VIII) below:

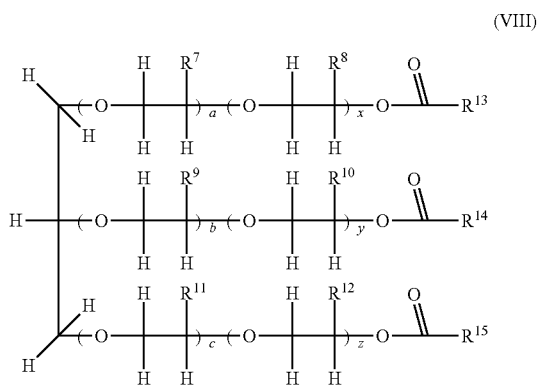

(VIII)

in which:

$R^7$, $R^8$, $R^9$, $R^{10}$, $R^{11}$ and $R^{12}$ are, independently of each other, H or $CH_3$;

a, b, c, y, x and z, are, independently of each other, an integer;

a+x, b+y and c+z are, independently of each other, integers ranging from 1 to 20;

$R^{13}$, $R^{14}$ and $R^{15}$ are, independently of each other, chosen from the group constituted by alkyls, which are aliphatic or branched, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls, $R^{13}$, $R^{14}$ and $R^{15}$ containing from 1 to 17 carbon atoms and possibly being optionally substituted.

According to a preferred embodiment, each of $R^{13}$, $R^{14}$ and $R^{15}$ represents, independently of each other, a linear or branched alkyl group, an alkenyl group or a cycloalkyl group, it being possible for said alkyl, alkenyl or cycloalkyl groups to comprise at least one heteroatom chosen from N, O, Si, F and S. Preferably, each of $R^{13}$, $R^{14}$ and $R^{15}$ contains, independently of each other, from 3 to 8 carbon atoms, preferably from 5 to 7 carbon atoms.

Preferably, a+x, b+y and c+z are, independently of each other, integers ranging from 1 to 10, preferentially from 2 to 8, and even more preferentially from 2 to 4.

Preferably, $R^7$, $R^8$, $R^9$, $R^{10}$, $R^{11}$ and $R^{12}$ represent H.

The polyol esters of formula (VIII) above may typically be prepared as described in paragraphs [0027] to [0030] of international patent application WO 2012/177742.

In particular, the polyol esters of formula (VIII) are obtained by esterification of glycerol alkoxylates (as described in paragraph [0027] of WO 2012/177742) with one or more monocarboxylic acids containing from 2 to 18 carbon atoms.

According to a preferred embodiment, the monocarboxylic acids have one of the following formulae:

$R^{13}$COOH $R^{14}$COOH and $R^{15}$COOH in which $R^{13}$, $R^{14}$ and $R^{15}$ are as defined above. Derivatives of the carboxylic acids may also be used, such as anhydrides, esters and acyl halides.

The esterification may be performed with one or more monocarboxylic acids. Preferred monocarboxylic acids are those chosen from the group constituted by acetic acid, propanoic acid, butyric acid, isobutanoic acid, pivalic acid, pentanoic acid, isopentanoic acid, hexanoic acid, heptanoic acid, octanoic acid, 2-ethylhexanoic acid, 3,3,5-trimethylhexanoic acid, nonanoic acid, decanoic acid, neodecanoic acid, undecanoic acid, dodecanoic acid, tridecanoic acid, myristic acid, pentadecanoic acid, palmitic acid, stearic acid, oleic acid, linoleic acid, palmitoleic acid, citronellic acid, undecenoic acid, lauric acid, undecylenic acid, linolenic acid, arachidic acid, behenic acid, tetrahydrobenzoic acid, hydrogenated or nonhydrogenated abietic acid, 2-ethylhexanoic acid, furoic acid, benzoic acid, 4-acetylbenzoic acid, pyruvic acid, 4-(tert-butyl)benzoic acid, naphthenic acid, 2-methylbenzoic acid, salicylic acid, isomers thereof, the methyl esters thereof, and mixtures thereof.

Preferably, the esterification is performed with one or more monocarboxylic acids chosen from the group constituted by pentanoic acid, 2-methylbutanoic acid, n-hexanoic acid, n-heptanoic acid, 3,3,5-trimethylhexanoic acid, 2-ethylhexanoic acid, n-octanoic acid, n-nonanoic acid and isononanoic acid.

Preferably, the esterification is performed with one or more monocarboxylic acids chosen from the group constituted by butyric acid, isobutyric acid, n-pentanoic acid, 2-methylbutanoic acid, 3-methylbutanoic acid, n-hexanoic acid, n-heptanoic acid, n-octanoic acid, 2-ethylhexanoic acid, 3,3,5-trimethylhexanoic acid, n-nonanoic acid, decanoic acid, undecanoic acid, undecylenic acid, lauric acid, stearic acid, isostearic acid and mixtures thereof.

According to another embodiment, the polyol esters according to the invention have the formula (IX) below:

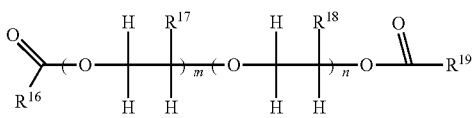

in which:
each of $R^{17}$ and $R^{18}$ is, independently of each other, H or $CH_3$;
each of m and n is, independently of each other, an integer, with m+n being an integer ranging from 1 to 10;
$R^{16}$ and $R^{19}$ are, independently of each other, chosen from the group constituted by alkyls, which are aliphatic or branched, alkenyls, cycloalkyls, aryls, alkylaryls, arylalkyls, alkylcycloalkyls, cycloalkylalkyls, arylcycloalkyls, cycloalkylaryls, alkylcycloalkylaryls, alkylarylcycloalkyls, arylcycloalkylalkyls, arylalkylcycloalkyls, cycloalkylalkylaryls and cycloalkylarylalkyls,
$R^{16}$ and $R^{19}$ containing from 1 to 17 carbon atoms and possibly being optionally substituted.

According to a preferred embodiment, each of $R^{16}$ and $R^{19}$ represents, independently of each other, a linear or branched alkyl group, an alkenyl group or a cycloalkyl group, it being possible for said alkyl, alkenyl or cycloalkyl groups to comprise at least one heteroatom chosen from N, O, Si, F and S. Preferably, each of $R^{16}$ and $R^{19}$ contains, independently of each other, from 3 to 8 carbon atoms, preferably from 5 to 7 carbon atoms.

According to a preferred embodiment, each of $R^{17}$ and $R^{18}$ represents H, and/or m+n is an integer ranging from 2 to 8, from 4 to 10, from 2 to 5 or from 3 to 5. In particular, m+n has the value 2, 3 or 4.

According to a preferred embodiment, the polyol esters of formula (IX) above are diesters of triethylene glycol or diesters of tetraethylene glycol, in particular with one or two monocarboxylic acids containing from 4 to 9 carbon atoms.

The polyol esters of formula (IX) above may be prepared by esterifications of an ethylene glycol, of a propylene glycol or of an oligo- or polyalkylene glycol (which may be an oligo- or polyethylene glycol, oligo- or polypropylene glycol or an ethylene glycol/propylene glycol block copolymer) with one or two monocarboxylic acids containing from 2 to 18 carbon atoms. The esterification may be performed identically to the esterification reaction performed to prepare the polyol esters of formula (VIII) above.

In particular, monocarboxylic acids identical to those used to prepare the polyol esters of formula (VIII) above may be used to form the polyol esters of formula (IX).

According to one embodiment, the lubricant based on polyol esters according to the invention comprises from 20% to 80%, preferably from 30% to 70% and preferentially from 40% to 60% by weight of at least one polyol ester of formula (VIII) and from 80% to 20%, preferably from 70% to 30% and preferentially from 60% to 40% by weight of at least one polyol ester of formula (IX).

Generally, some alcohol functional groups may not be esterified during the esterification reaction; however, their proportion remains low. Thus, the POEs may comprise between 0 relative mol % and 5 relative mol % of $CH_2OH$ units, relative to the $—CH_2—O—C(=O)—$ units.

The POE lubricants preferred according to the invention are those having a viscosity of 1 to 1000 centistokes (cSt) at 40° C., preferably of 10 to 200 cSt, even more preferentially of 20 to 100 cSt and advantageously of 30 to 80 cSt.

The international classification of oils is notably given by the standard ISO3448-1992 (NF T60-141), according to which the oils are designated by their class of mean viscosity measured at a temperature of 40° C.

Uses

The composition according to the present invention is most particularly suitable for use as a heat-transfer fluid in refrigeration and air conditioning and for heating, and preferably in refrigerated transport, air conditioning and heating in motor vehicles.

The present invention relates to the use of the composition according to the invention to reduce the risks of ignition and/or of explosion in the event of leakage of refrigerant.

The low flammability of the composition advantageously allows its use in greater amounts in heat-transfer facilities. The use of refrigerants according to the flammability classes is notably described in the standard ISO 5149-1 (2014 version).

The present invention also relates to the use of a composition according to the invention or of a heat-transfer composition according to the invention in a heat-transfer system containing a vapor compression circuit.

According to one embodiment, the heat-transfer system is:
  an air conditioning system; or
  a refrigeration system; or
  a freezing system; or
  a heat pump system.

The present invention also relates to a heat-transfer process based on the use of a heat-transfer facility containing a vapor compression circuit which comprises the composition according to the invention or the heat-transfer composition according to the invention. The heat-transfer process may be a process for heating or cooling a fluid or a body.

The composition according to the invention or the heat-transfer composition may also be used in a process for producing mechanical work or electricity, in particular in accordance with a Rankine cycle.

The invention also relates to a heat-transfer facility comprising a vapor compression circuit containing the composition according to the invention or the heat-transfer composition according to the invention.

According to one embodiment, this facility is chosen from mobile or stationary facilities for refrigeration, for heating (heat pump), for air conditioning and for freezing, and heat engines.

It may in particular be a heat pump facility, in which case the fluid or body which is heated (generally air and optionally one or more products, objects or organisms) is located in a room or a vehicle passenger compartment (for a mobile facility). According to a preferred embodiment, it is an air conditioning facility, in which case the fluid or body which is cooled (generally air and optionally one or more products, objects or organisms) is located in a room or a vehicle passenger compartment (for a mobile facility). It may be a refrigeration facility or a freezing facility (or cryogenic facility), in which case the fluid or body which is cooled generally comprises air and one or more products, objects or organisms located in a room or a container.

According to one embodiment, the heat-transfer facility is a facility whose electrical power is less than or equal to 50 kW, preferably less than or equal to 30 kW, particularly less than or equal to 22 kW and more particularly less than or equal to 10 kW and more specifically less than or equal to 2 kW. As application in commercial cold, examples that may be mentioned include refrigerated display cabinets, cold rooms, ice machines, and the like; as application in heating, examples that may be mentioned include heat pumps, air/air heat pumps, air/water heat pumps, thermodynamic water heater, and the like; as application in residential air conditioning, examples that may be mentioned include mono-split facilities, multi-split facilities, central air distribution facilities, variable refrigerant volume facilities, and the like; as application in mobile air conditioning, examples that may be mentioned include heat pumps and motor vehicle air conditioning.

A subject of the invention is also a process for heating or cooling a fluid or a body by means of a vapor compression circuit containing a heat-transfer fluid or a heat-transfer composition, said process successively comprising the evaporation of the heat-transfer fluid or composition, the compression of the heat-transfer fluid or composition, the condensation of the heat-transfer fluid or composition and the expansion of the heat-transfer fluid or composition, in which the heat-transfer fluid is the composition according to the invention, or the heat-transfer composition is that described above.

A subject of the invention is also a process for producing electricity by means of a heat engine, said process successively comprising the evaporation of the heat-transfer fluid or of a heat-transfer composition, the expansion of the heat-transfer fluid or composition in a turbine, making it possible to generate electricity, the condensation of the heat-transfer fluid or composition and the compression of the heat-transfer fluid or composition, in which the heat-transfer fluid is the composition according to the invention and the heat-transfer composition is that described above.

The vapor compression circuit, containing a heat-transfer fluid or composition according to the invention, comprises at least one evaporator, one compressor, preferably a positive displacement piston compressor, one condenser and one expansion valve, and also lines for transporting the heat-transfer fluid or composition between these elements. The evaporator and the condenser comprise a heat exchanger which allows an exchange of heat between the heat-transfer fluid or composition and another fluid or body. Preferably, the heat exchanger is an air/refrigerant exchanger.

The evaporator used in the context of the invention may be a dry expansion evaporator or a flooded evaporator. In a dry expansion evaporator, all of the abovementioned heat-transfer fluid or composition is evaporated at the outlet of the evaporator, and the vapor phase is superheated.

In a flooded evaporator, the heat-transfer fluid/composition in liquid form does not completely evaporate. A flooded evaporator includes a separator of liquid phase and of vapor phase.

Use may notably be made, as compressor, of a single-stage or multistage centrifugal compressor or of a mini centrifugal compressor. Rotary, reciprocating or screw compressors may also be used.

According to another embodiment, the vapor compression circuit comprises a screw compressor, preferably a twin-screw or single-screw compressor. In particular, the vapor compression circuit comprises a twin-screw compressor, which can employ a sizeable oil stream, for example up to 6.3 l/s.

A centrifugal compressor is characterized in that it uses rotating elements to radially accelerate the heat-transfer fluid or composition; it typically comprises at least one rotor and one diffuser housed in a chamber. The heat-transfer fluid or the heat-transfer composition is introduced into the center of the rotor and circulates towards the periphery of the rotor while undergoing acceleration. Thus, on the one hand, the static pressure increases in the rotor and above all, on the other hand, at the diffuser, the velocity is converted into an increase in the static pressure. Each rotor/diffuser assembly constitutes a stage of the compressor. Centrifugal compressors can comprise from 1 to 12 stages, according to the desired final pressure and the volume of fluid to be treated. The degree of compression is defined as being the ratio of the absolute pressure of the heat-transfer fluid/composition at the outlet to the absolute pressure of said fluid or of said composition at the inlet. The rotational speed for large centrifugal compressors ranges from 3000 to 7000 revolutions per minute. Small centrifugal compressors (or mini centrifugal compressors) generally operate at a rotational speed which ranges from 40 000 to 70 000 revolutions per minute and include a small-sized rotor (generally less than 0.15 m). Use may be made of a multistage rotor in order to improve the efficiency of the compressor and to limit the energy cost (in comparison with a single-stage rotor). For a two-stage system, the outlet of the first stage of the rotor feeds the inlet of the second rotor. The two rotors can be mounted on a single axis. Each stage can provide a compression ratio of the fluid of approximately 4 to 1, that is to say that the absolute outlet pressure can be equal to approximately four times the absolute suction pressure. Examples of two-stage centrifugal compressors, in particular for motor vehicle applications, are described in the documents U.S. Pat. Nos. 5,065,990 and 5,363,674.

The centrifugal compressor can be driven by an electric motor or by a gas turbine (for example fed by the exhaust gases of a vehicle, for mobile applications) or by gearing.

The facility may comprise a coupling of the expansion valve with a turbine in order to generate electricity (Rankine cycle).

The facility may also optionally comprise at least one heat-exchange fluid circuit used to transmit the heat (with or without change of state) between the circuit of the heat-transfer fluid or of the heat-transfer composition and the fluid or body to be heated or cooled.

The facility may also optionally comprise two (or more) vapor compression circuits containing identical or different heat-transfer fluids/compositions. For example, the vapor compression circuits may be coupled to each other.

The vapor-compression circuit operates according to a conventional cycle of vapor compression. The cycle comprises the change of state of the heat-transfer fluid/composition from a liquid phase (or liquid/vapor dual phase) to a vapor phase at a relatively low pressure, then the compression of the fluid/composition in the vapor phase up to a relatively high pressure, the change of state (condensation) of the heat-transfer fluid/composition from the vapor phase to the liquid phase at a relatively high pressure, and the reduction of the pressure in order to restart the cycle.

In the case of a cooling process, heat resulting from the fluid or from the body which is being cooled (directly or indirectly, via a heat-exchange fluid) is absorbed by the heat-transfer fluid/composition, during the evaporation of the latter, this being performed at a relatively low temperature relative to the surroundings. The cooling processes comprise air conditioning processes (with mobile facilities, for example in vehicles, or stationary facilities), refrigeration processes and freezing processes or cryogenics processes. In the field of air conditioning, mention may be made of domestic, commercial or industrial air conditioning, where the items of equipment used are either chillers or direct expansion items of equipment. In the field of refrigeration, mention may be made of domestic or commercial refrigeration, cold rooms, the food industry or refrigerated transport (trucks, ships, containers).

In the case of a heating process, heat is transferred (directly or indirectly, via a heat-exchange fluid) from the heat-transfer fluid/composition, during the condensation of the latter, to the fluid or to the body which is being heated, this being performed at a relatively high temperature relative to the surroundings. The facility for performing the heat transfer is known, in this case, as a "heat pump". They may notably be medium- and high-temperature heat pumps.

Any type of heat exchanger may be used for the implementation of the compositions according to the invention or heat-transfer composition according to the invention, and in particular cocurrent heat exchangers or, preferably, countercurrent heat exchangers. Exchangers of air/refrigerant type may also be used and are moreover preferred.

According to the invention, the term "countercurrent heat exchanger" means a heat exchanger in which heat is exchanged between a first fluid and a second fluid, the first fluid at the inlet of the exchanger exchanging heat with the second fluid at the outlet of the exchanger, and the first fluid at the outlet of the exchanger exchanging heat with the second fluid at the inlet of the exchanger.

For example, countercurrent heat exchangers include devices in which the flow of the first fluid and the flow of the second fluid are in opposite directions or virtually opposite directions. Exchangers operating in cross-current mode with a countercurrent tendency are also included among the countercurrent heat exchangers within the meaning of the present patent application.

However, according to a preferred embodiment, the invention provides for the cooling and heating processes, and the corresponding facilities, to comprise an air/refrigerant heat exchanger, either at the condenser or at the evaporator. This is because the compositions according to the invention or heat-transfer compositions which are defined above are particularly effective with these heat exchangers.

In "low-temperature refrigeration" processes, the inlet temperature of the composition according to the invention or heat-transfer composition at the evaporator is preferably from −45° C. to −15° C., notably from −40° C. to −20° C., more particularly preferably from −35° C. to −25° C. and, for example, about −30° C. or −20° C.; and the temperature of the start of condensation of the composition according to the invention or heat-transfer compositions at the condenser is preferably from 25° C. to 80° C., notably from 30° C. to 60° C., more particularly preferably from 35° C. to 55° C. and, for example, about 40° C.

In "moderate-temperature cooling" processes, the inlet temperature of the composition according to the invention or heat-transfer composition at the evaporator is preferably from −20° C. to 10° C., notably from −15° C. to 5° C., more particularly preferably from −10° C. to 0° C. and, for example, about −5° C.; and the temperature of the start of condensation of the composition according to the invention or heat-transfer composition at the condenser is preferably from 25° C. to 80° C., notably from 30° C. to 60° C., more particularly preferably from 35° C. to 55° C. and, for example, about 50° C. These processes may be refrigeration or air conditioning processes.

In "moderate-temperature heating" processes, the inlet temperature of the composition according to the invention or heat-transfer composition at the evaporator is preferably from −20° C. to 10° C., notably from −15° C. to 5° C., more particularly preferably from −10° C. to 0° C. and, for example, about −5° C.; and the temperature of the start of condensation of the composition according to the invention or heat-transfer composition at the condenser is preferably from 25° C. to 80° C., notably from 30° C. to 60° C., more particularly preferably from 35° C. to 55° C. and, for example, about 50° C.

The composition according to the present invention may be used to replace various heat-transfer fluids in various heat-transfer applications. For example, the compositions according to the invention may be used to replace R404A, R452A, R449A, R449C, R448A, R22, R134a, R152a, R422, R502, R407A, R407F, R407C, R1234yf or R1234ze.

In some embodiments, the invention provides compositions which have energy performance qualities that are equivalent or improved in comparison with usual heat-transfer fluids, notably in comparison with R404A.

According to some embodiments, the replacement of R404A may advantageously be performed without modifying the heat-transfer facility or its operating parameters. In particular, the replacement of R404A may be performed without modifying the technology of the compressors.

Correspondingly, the compositions according to the invention are particularly appropriate for all applications in which R404A is generally used. The compositions of the invention are thus particularly appropriate for refrigerated transport applications and in particular refrigerated containers, motor vehicle air conditioning or motor vehicle heating.

All the embodiments described above can be combined with each other. In particular, the abovementioned uses can be applied to all the preferred or non-preferred compositions of the invention.

In the context of the invention, the term "between x and y" or "from x to y" means an interval in which the limits x and y are included. For example, the range "between 1% and 2%" notably includes the values 1% and 2%.

The invention claimed is:

1. A composition comprising:
   from 1% to 8% by weight trifluoroethylene;
   greater than 5% by weight of pentafluoroethane; and
   from 70% to 93% by weight of 2,3,3,3-tetrafluoropropene.

2. The composition as claimed in claim 1, in which the weight content of trifluoroethylene is greater than or equal to 5%.

3. The composition as claimed in claim 1, in which the weight content of pentafluoroethane is greater than or equal to 10%.

4. The composition as claimed in claim 1, in which the weight content of 2,3,3,3-tetrafluoropropene is greater than or equal to 75%.

5. The composition as claimed in claim 1, wherein it is:
   from 5% to 8% by weight of trifluoroethylene;
   from 6% to 20% by weight of pentafluoroethane; and
   from 70% to 89% by weight of 2,3,3,3-tetrafluoropropene.

6. The composition as claimed in claim 1, wherein it:
   from 1% to 8% by weight of trifluoroethylene;
   greater than 5% by weight of pentafluoroethane; and
   from 50% to 98% 90% to 93% by weight of 2,3,3,3-tetrafluoropropene.

7. The composition as claimed in claim 1, comprising:
   trifluoroethylene;
   pentafluoroethane;
   1,1,1,2-tetrafluoroethane; and
   2,3,3,3-tetrafluoropropene.

8. The composition as claimed in claim 1, wherein it has a GWP of less than 2000.

9. A heat-transfer fluid comprising the composition as claimed in claim 1.

10. A method for replacing R404A, R452A, R449A, R449C, R448A, R22, R134a, R152a, R422, R502, R407A, R407F, R407C, R1234yf or R1234ze in a heat-transfer system, the method comprising replacing R404A, R452A, R449A, R449C, R448A, R22, R134a, R152a, R422, R502, R407A, R407F, R407C, R1234yf or R1234ze with a composition as claimed in claim 1.

11. A heat-transfer composition comprising the composition as claimed in claim 1 and at least one additive chosen from nanoparticles, stabilizers, surfactants, tracing agents, fluorescent agents, odorous agents, lubricants, and solubilizing agents.

12. A heat-transfer system containing a vapor compression circuit comprising the composition as claimed in claim 1.

13. The composition as claimed in claim 1, comprising:
   from 1% to 5% by weight of trifluoroethylene;
   greater than 5% by weight of pentafluoroethane; and
   from 70% to 93% by weight of 2,3,3,3-tetrafluoropropene.

14. The composition as claimed in claim 1, comprising:
   from 1% to 5% by weight of trifluoroethylene;
   greater than 5% by weight of pentafluoroethane; and
   from 90% to 93% by weight of 2,3,3,3-tetrafluoropropene.

15. A heat-transfer facility comprising a vapor compression circuit containing the composition comprising:
   from 1% to 8% by weight trifluoroethylene;
   greater than 5% by weight of pentafluoroethane; and
   from 70% to 93% by weight of 2,3,3,3-tetrafluoropropene.

16. A process for heating or cooling a fluid or a body by means of a vapor compression circuit containing a heat-transfer fluid, said process successively comprising the evaporation of the heat-transfer fluid, the compression of the heat-transfer fluid, the condensation of the heat-transfer fluid and the expansion of the heat-transfer fluid, in which the heat-transfer fluid is a composition as claimed in claim 1.

17. The process as claimed in claim 16, chosen from:
   a process for cooling a fluid or a body, in which the temperature of the cooled fluid or body is from −40° C. to −10° C.;
   a process for cooling a fluid or a body, in which the temperature of the cooled fluid or body is from −15° C. to 15° C.; and
   a process for heating a fluid or a body, in which the temperature of the heated fluid or body is from 30° C. to 80° C.

* * * * *